June 15, 1954

M. H. SWEET 2,680,990

OPTICAL FEEDBACK PHOTOMETER

Original Filed April 4, 1946

INVENTOR
MONROE H. SWEET

BY
ATTORNEYS

Patented June 15, 1954

2,680,990

UNITED STATES PATENT OFFICE 2,680,990

OPTICAL FEEDBACK PHOTOMETER

Monroe H. Sweet, Binghamton, N. Y., assignor to General Aniline & Film Corporation, New York, N. Y., a corporation of Delaware Original application April 4, 1946, Serial No. 659,457, now Patent No. 2,649,834, dated August 25, 1953. Divided and this application December 28, 1951, Serial No. 263,933

4 Claims. (Cl. 88—14)

This invention relates to photoelectric measuring circuits, and more particularly to circuits for apparatus used in determining photographic density.

In numerous mensuration operations, an object is to obtain a direct indication of values which are logarithmic functions of the quantity. A typical example is the measurement of the density of a photographic film. In the usual measuring instrument for determining the value of the film density, the light flux transmitted through the film is directed upon a suitable photo-sensitive device, such as a photo-emissive vacuum tube. The output of the phototube is then amplified and the relative value thereof indicated upon a suitable meter. The radiant flux incident upon the phototube is an inverse logarithmic function of the density of the film. If the output of the phototube is linearly amplified, the indicating meter must be provided with a scale which is graduated logarithmically, in order to read density directly on the meter. As is known, a logarithmic scale is non-uniformly graduated, the indicia thereof being crowded near one end of the scale and being widely spaced near the opposite end thereof. The non-uniformity of the scale graduations adversely affects the accuracy and facility of the meter readings.

Various expedients have been proposed for obtaining direct indications of density on a meter having a substantially uniformly graduated scale. Among other expedients, cut pole pieces have been used in the meter to vary the sensitivity of response thereof over different portions of the scale. The results obtainable by such expedients have been generally unsatisfactory. In my U. S. Patent 2,406,716 entitled "Direct Reading Densitometer," there is described a suitable electronic measuring circuit for obtaining direct readings upon a uniformly graduated meter scale of the density of a photographic film. In this circuit, a logarithmic amplifier is provided between the output of a phototube and the indicating meter. The parameters of the amplifier are so selected that the meter indicates directly the density of the sample upon a uniformly graduated scale. The light flux incident upon the phototube is an inverse logarithmic function of the density of the sample, and the output current of the phototube is a direct function of the light incident thereupon. By interposing a logarithmically responsive amplifier between the phototube and the meter, such compensation is effected that the relative current flowing through the meter becomes a direct function of the density of the sample. The patented circuit has had very satisfactory commercial use.

Instead of a logarithmic amplifier, it is in many respects desirable to employ a conventional linear amplifier which is simpler to construct and maintain in operation. Accordingly, the present invention comprises a measuring circuit in which, although a linear amplifier is used, direct indication is obtained of logarithmic values. The necessary compensation is effected by controlling the luminous excitation of the light source in accordance with the response of a photo-emissive vacuum tube or similar photo-sensitive element.

It is, therefore, among the objects of this invention to provide a simple, logarithmically responsive measuring circuit; to provide such a circuit including a linear amplifier controlling the intensity of a light energy emitting element responsive to the output of an energy sensing element, the latter receiving incident light energy from the energy emitting element; to provide a logarithmically responsive measuring circuit including a light source, a photo-emissive vacuum tube arranged in operative relation therewith, and a linear amplifier controlling the energizing of the light source in response to the output of the photo-emissive vacuum tube; and to provide such a logarithmically responsive measuring circuit in which the indicating means may be connected either in the output circuit of the amplifier or in the input circuit of the light source.

These and other objects, advantages and novel features will be apparent from the following description of the invention pointed out in particularity in the appended claims and taken in connection with the accompanying drawing, in which:

Basically, the measuring system, in accordance with the present invention, comprises a radiant flux receiving element such as a phototube arranged to receive light from a source through a translucent sample. The phototube current, which is directly proportional to the light intensity, is amplified by means of a conventional linear amplifier, and the output of the amplifier in turn is utilized to control the luminous excitation of the source. In this manner a feedback loop is established between the linearly amplified output of the phototube and the source from which excitation of the light is derived.

The salient feature, in the above circuit arrangement, is that, although linear response conditions exist throughout the system, a logarithmically varying quantity, such as the density of a sample, may be directly indicated over a scale of an indicating meter which is uniformly graduated in terms of density. This is accomplished by employing a lamp for the light source which converts electrical energy into radiant energy and has such inherent characteristics that the radiant energy bears a logarithmic relation to the electrical energy supplied to the lamp; in other words, the candle power output thereof varies approximately logarithmically as a function of the electric current or voltage applied to the lamp. Various types of incandescent lamps are known to possess this desirable characteristic.

It was mentioned before that in determining the density, the radiant flux incident upon the phototube is an inverse logarithmic function of the density of the film. Consequently, when this circuit is used for density measurements, the amount of light reaching the phototube from the lamp through the sample varies inversely with the logarithm of the density. The measuring instrument connected directly to indicate the phototube current would require a logarithmic scale unless provision is made for changing this indication, that is, for correcting the indication in accordance with a logarithmic compensator. Intead of varying the indication of the meter anywhere in it energizing circuit the light intensity which excites the phototube is caused to vary in such manner as to compensate for the linear response of the phototube and provide a logarithmic response in the system. With this compensation in the circuit response, the indicating meter may have a standard, uniformly graduated scale to give direct readings of the density of the sample interposed between the lamp and the phototube.

Figure 1:
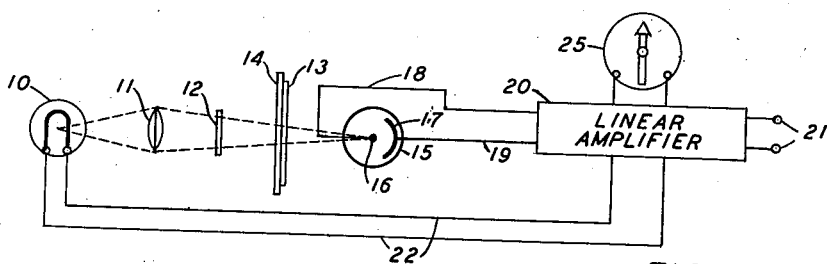
Figure 1 is a block diagram illustrating the general interconnection of the component elements.

Referring to Figure 1 of the drawing, the invention is illustrated, by way of example, as incorporated in a direct reading densitometer in which a uniformly graduated scale meter provides direct indication of the density of a sample being examined. For this purpose, light from a suitable electric lamp 10, which is an incandescent lamp, is concentrated by a condenser lens 11 and directed, through a suitable filter 12 and a sample 13 mounted on a support 14, upon the cathode 16 of a photoemissive vacuum tube 15. Cathode 16 and anode 17 are connected by conductors 18 and 19, respectively, to the input of a linear amplifier 20. Amplifier 20 is supplied with operating potential from a suitable source of preferably constant D. C. potential, not shown here, connected to terminals 21. The amplifier includes means for controlling the illumination of lamp 10, in a manner described more fully hereinafter, and for this purpose, the lamp 10 is shown connected to the amplifier by means of conductors 22. A suitable indicating meter 25 is actuated by the amplifier 20, and is shown connected thereto as indicated.

The operation of the arrangement is as follows. The density of sample 13 is an inverse logarithmic function of its light transmission. The transmission, in turn, is a measure of the amount of light reaching phototube 15 from source 10 through the sample with a constant intensity of the source. From the data relating lamp current or voltage applied to its terminal to relative lamp candle power, it can be shown that the candle power is a logarithmic function of the applied voltage, insofar as respects an incandescent lamp (see Weaver and Hussong, "Note on the Color Temperature—Candle Power Characteristics of Tungsten Lamps," J. O. S. A. 29, Jan. 17, 1939). Accordingly, if the operating potential applied to light source 10 is modified as an inverse function of the output current of phototube 15, the candle power of source 10 will be varied logarithmically as an inverse function of the phototube output current. Consequently, a suitable current or voltage indicating means connected either in the output circuit of phototube 15 or in the energizing circuit of source 10 will directly indicate the density on a uniformly graduated scale.

In effect, the intensity of lamp 10 is controlled in such a manner that at low densities (i. e., high light transmission values) the light flux incident upon phototube 15 is a minimum, and as the density of sample 13 increases (i. e., less light is transmitted) the intensity of lamp 10 is also increased. With such an arrangement, it is possible to obtain a uniform response of meter 25 to the density of sample 13.

If meter 25 is calibrated to read densities from 0.0 to 3.0, which is a useful range, and with high linear amplification of the output current of phototube 15, the following relationships apply:

$$F_C = \frac{M}{F_U}$$

where $F_C$ is the lamp intensity as automatically corrected, or modulated, to obtain direct readings of density upon the substantially uniformly graduated scale of meter 25, M is the relative meter response and $F_U$ is the relative light flux which would be transmitted if the lamp intensity were not changed. Furthermore, $$F_U = \text{antilog} \ (3.0 - D)$$

where D is the density of sample 13 and unit flux is assumed for the lamp at density 3.0. From these two equations, it will be apparent that $$F_C = \frac{M}{\text{antilog} \ (3.0 - D)}$$

In other words, in order to obtain uniform meter response for differing density values of sample 13, the corrected lamp intensity must vary directly as the meter response and inversely as the antilog of the total meter density reading minus the density of sample 13. As explained above, this is accomplished in the present circuit by linear compensation of the operating potential applied to light source 10, which results in logarithmic variation of the candle power or flux output thereof.

Figure 2:
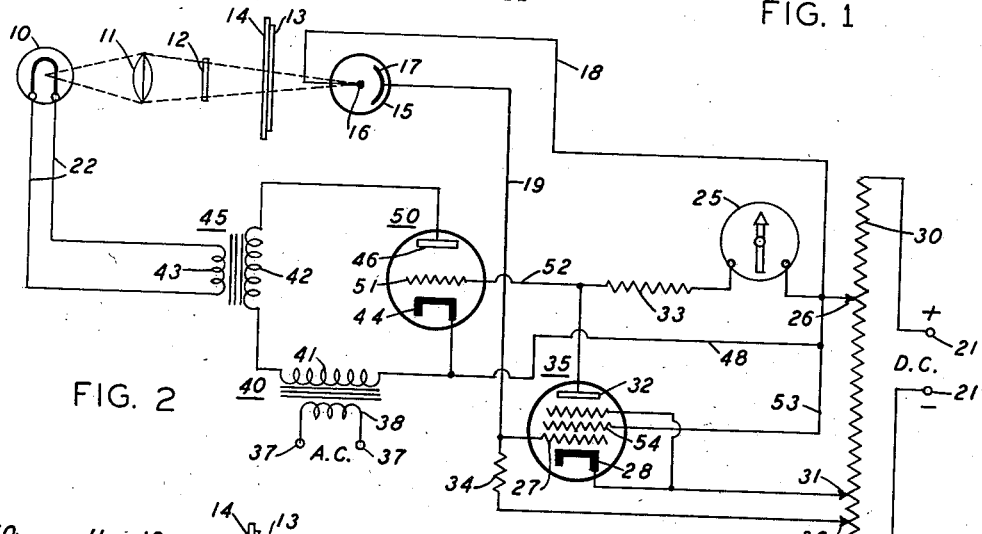
Figure 2 is a schematic circuit diagram of one embodiment of the invention.

Figure 2 represents a specific embodiment of an arrangement for obtaining the results of the circuit of Figure 1. The operating potentials are derived from a suitable source of substantially constant D. C. potential connected between terminals 21 of a voltage divider 30. Cathode 16 of phototube 15 is connected through conductor 18 to a tap 26 on the divider 30. Conductor 19 connects anode 17 to the control grid 27 of an amplifier tube 35. Cathode 28 of tube 35 is connected to a tap 31 of divider 30. Anode 32 of tube 35 is connected through a suitable load resistor 33 and in series with the indicating meter 25 to tap 26.

The load resistor 34 of the phototube 15 is also utilized as the input circuit or grid resistance for the amplifier tube 35. A minimum bias voltage for this tube is derived from the voltage divider between cathode 28 and tap 36. The ohmic value of resistor 34 is preferably high in the neighborhood of 20 megohms in order to insure a satisfactory voltage drop for biasing the amplifier tube 35 when the phototube is conducting.

With the described arrangement, as the light falling upon phototube 15 from source 10 through sample 13 increases, the phototube output current increases. This current produces a voltage drop across resistor 34 driving the grid 27 more positive, which, in turn, increases the conductivity of tube 35. The increase or decrease in the conductivity of tube 35 is utilized to change the effective bias voltage of a control tube 50. The purpose of this arrangement will be apparent hereinafter.

The incandescent lamp 10 is energized from an alternating current source connected to terminals 37 and applied to the primary winding 38 of a transformer 40. The secondary winding 41 of transformer 40 is connected in series with the primary winding 42 of transformer 45 and control tube 50. Conductors 22 connect the secondary winding 43 of transformer 45 to the filament of lamp 10. In a specific example, transformer 40 may raise the potential of the supply line to 500 volts in order to provide sufficient anode voltage for the control tube 50. Transformer 45, on the other hand, will reduce the voltage applied to the primary winding 42 to about six volts required for the lamp 10 which may have a six candle power rating.

The secondary winding 41 of transformer 40 and the primary winding 42 of transformer 45 are in series and the free terminals thereof connect to the anode 46 and cathode 44 of the control tube 50, respectively. The circuit of the control grid 51 is completed to the cathode 44 through the anode load resistance 33 of the amplifier tube 35 in series with the indicating meter 25.

As can be seen from the circuit, the effective anode voltage for the tube 50 is derived from the secondary winding 41 of the transformer 40, whereas the grid voltage is derived from the current flowing through the load resistor 33. When there is no current flowing in this resistor, the grid 51 has zero bias and is effectively at cathode potential. This condition calls for maximum anode current of tube 50 providing a maximum energy transfer from the A. C. source to the exciter light 10. Any variation in conductivity of the tube 35 will cause corresponding current variations in the load resistor 33 resulting in a corresponding grid voltage change for the tube 50. This voltage is negative with respect to the cathode 44 inasmuch as the conductivity of the amplifier tube 35 impresses on the grid 51 a potential more negative than the cathode 44. Current variations of the tube 35 as pointed out above depend on the light intensity reaching the photocell and are a direct function thereof. These variations impressed on the control tube 51 will cause variations in the light intensity of the exciter lamp 10 inasmuch as the current in the primary winding 42 depends on the conductivity of the tube 50. In view of the fact that the characteristics of the exciter lamp 10 are such that variations of filament excitation produce a logarithmic variation of candle power output the light energy impressed on the photocell will vary logarithmically with respect to the linear variation of energizing voltage of the lamp 10.

As set forth above, the anode potential of tube 35 varies inversely with the output current of phototube 15, and thus inversely as a linear function of the light incident upon the latter from lamp 10 through sample 13. Accordingly, the illumination of lamp 10 is varied as an inverse logarithmic functon of the light incident upon phototube 15. Meter 25 measures the current flow in the output circuit of amplifier 35, and thus indicates directly, on a uniformly graduated scale, the density of sample 13 as measured by phototube 15, in accordance with the relations between compensated lamp intensity and incident flux versus meter reading set forth above.

Figure 3:
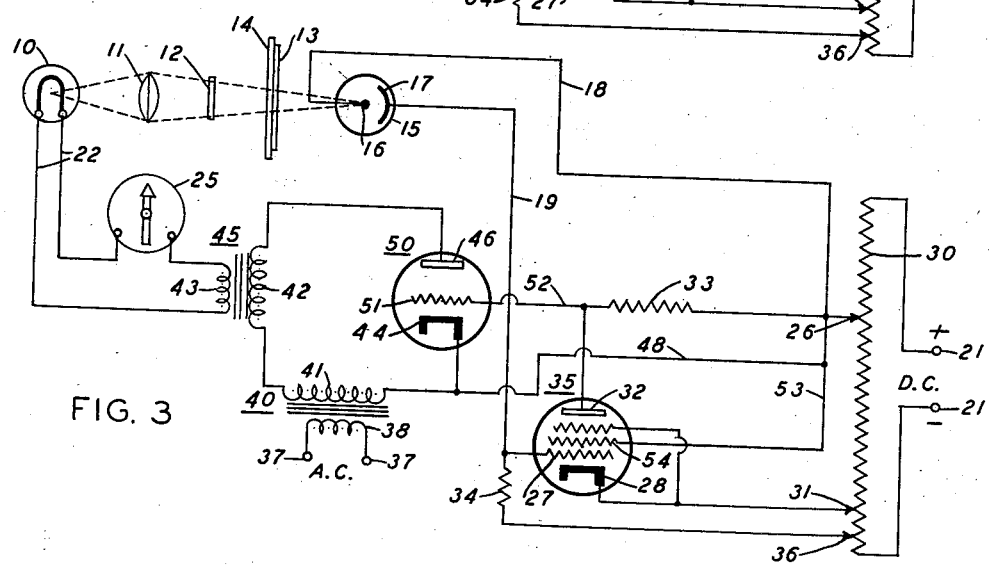
Figure 3 is a schematic circuit diagram of another embodiment of the invention.

Figure 3 represents another embodiment of the invention which differs from that shown in Figure 2 only in the location of meter 25. In Figure 3, elements identical with those in Figure 2 have been given the same reference characters. As shown, meter 25 is connected in the supply circuit of lamp 10, being serially interposed between conductor 22 and one terminal of winding 43. As the energizing voltage of lamp 10 varies with the conductivity of control tube 50 which is dependent on the anode voltage of tube 35, the same relation exists as in the circuit of Figure 2 and the current indication of meter 25 dirctly represents the density of sample 13 upon a uniformly graduated scale. The circuit of Figure 3 otherwise operates in the same manner as does the circuit of Figure 2.

With the described arrangements, an optical feedback effect is produced in which the energizing of the light source is varied as an inverse function of the phototube output current. This, in turn, varies the lamp intensity as an inverse logarithmic function of the phototube output current. Consequently, logarithmic compensation necessary in density measurements is automatically accomplished so that a meter whose response is linear with respect to current may be used to directly indicate density upon a substantially uniformly graduated scale. Thus, a logarithmically responsive measuring circuit is provided incorporating a linear noncompensated amplifier which need not be operated under such conditions as to have a logarithmic relation of grid potential to grid current.

It will be understood that other means of controlling the energizing current of the light source in response to the output of the phototube may be used. For example, a radio frequency oscillator circuit, such as commonly used in sound motion picture projectors for the exciter lamps, may be incorporated in the present arrangement. The essential requirement is that the intensity of the light source decreases in response to an increase in the flux incident upon the photo element, and that the overall gain of the amplifier system is high.

This application is a division of my copending application, Serial No. 659,457, filed April 4, 1946, for "Optical Feedback Photometers," now Patent No. 2,649,834, issued August 25, 1953.

I claim:

1. An electrical measuring apparatus for directly indicating the photographic density of translucent sample materials, comprising a photoelectric tube, a source of operating potentials therefor, an exciter lamp arranged to illuminate said tube through samples which may be placed between said lamp and said tube, said lamp being of the filamentary incandescent type having such characteristics that the light intensity emitted therefrom bears a logarithmic relation to the electrical current supplied to the filament, a circuit for supplying current to said filament, electronic means of variable conductivity in said circuit for varying the magnitude of said filament current, a control circuit including electronic control means connected between said phototube and said filament current varying means operable to alter the conductivity of said current varying means in inverse relation to the phototube current which is directly related to the light reaching said phototube upon a sample being placed between said lamp and said phototube, whereby the light intensity of said lamp is varied in inverse relation to the density of said sample, and a current flow measuring means in said control circuit, the indication of which may be marked directly in linearly spaced density values.

2. An electrical measuring system for determining the density of translucent materials, comprising a photoelectric tube, a load resistance and a source of operating potential for said tube, an exciter light arranged to illuminate said phototube through said translucent materials, said exciter light comprising a filamentary incandescent lamp having such characteristics that the light intensity emitted therefrom bears a logarithmic relation to the electrical energy supplied to said filament, a circuit for energizing said filament including a source of potential and a vacuum tube having anode and cathode electrodes connected effectively between said source and said filament and a grid electrode connected to said cathode through a grid resistor, the conductivity of said vacuum tube determining the current supplied to said filament and control means comprising an amplifier tube having an input circuit including said load resistance and an output circuit including said grid resistor, whereby current variations in said output circuit control the conductivity of said vacuum tube in inverse relation to the response of said phototube, and the light intensity of said lamp is varied in inverse relation to the density of said material and a current indicating device connected in said output circuit, the indication of which may be marked directly in linearly spaced values of density.

3. An electrical measuring system for determining the density of translucent materials, comprising a photoelectric tube, a load resistance and a source of operating potential for said tube, an exciter light arranged to illuminate said phototube through said translucent materials, said exciter light comprising a filamentary incandescent lamp having such characteristics that the light intensity emitted therefrom bears a logarithmic relation to the electrical energy supplied to said filament, a circuit for energizing said filament including a source of potential and a vacuum tube having anode and cathode electrodes connected effectively between said source and said filament and a grid electrode connected to said cathode through a grid resistor, the conductivity of said vacuum tube determining the current supplied to said filament and control means comprising an amplifier tube having anode, cathode and control electrodes, an input circuit including said load resistance between said grid and cathode electrodes and an output circuit including said grid resistor and an anode current meter between said anode and cathode electrodes whereby anode current variations in said output circuit develops a voltage drop across said grid resistor and control the conductivity of said vacuum tube in inverse relation to the response of said phototube, and the light intensity of said lamp is varied in inverse relation to the density of said material, the indication of said meter being proportional to the density of said material may be marked directly in linearly spaced values.

4. An electrical measuring system for determining the photographic density of translucent materials, comprising a photoelectric tube, a load resistance and a source of operating potential for said tube, an exciter light arranged to illuminate said phototube through samples which may be placed between said lamp and said tube, said exciter light comprising a filamentary incandescent lamp having such characteristics that the light intensity emitted therefrom bears a logarithmic relation to the electrical energy supplied to said filament, a circuit for energizing said filament including a source of potential and a vacuum tube having anode and cathode electrodes connected effectively between said source and said filament and a grid electrode connected to said cathode through a grid resistor, the conductivity of said vacuum tube determining the current supplied to said filament and control means comprising an amplifier tube having anode, cathode and control electrodes, an input circuit including said phototube load resistance between said grid and cathode electrodes and an output circuit including said grid resistor and an anode current meter between said anode and cathode electrodes whereby anode current variations in said output circuit develop a voltage drop across said grid resistor, the conductivity of said vacuum tube being thereby controlled in inverse relation to the current conductivity of said phototube and the light intensity of said lamp being varied in inverse relation to the density of said material, the indication of said meter being proportional to the density of said material, may be marked directly in linearly spaced values.

References Cited in the file of this patent

UNITED STATES PATENTS

| Number | Name | Date |
|---|---|---|
| 1,973,469 | Denis | Sept. 11, 1934 |
| 2,241,557 | Nichols | May 13, 1941 |
| 2,245,124 | Bonn | June 10, 1941 |